US012654251B1

(12) United States Patent
Maxwell et al.

(10) Patent No.: US 12,654,251 B1
(45) Date of Patent: Jun. 16, 2026

(54) METHODS OF USING INDUCTION HEATING AND MOISTURE BARRIERS TO PERFORM IN-SERVICE PIPELINE MAINTENANCE

(71) Applicant: WeldFit LLC, Houston, TX (US)

(72) Inventors: Frede J. Maxwell, League City, TX (US); Paul Gonzalez, Dickinson, TX (US)

(73) Assignee: WELDFIT LLC, Houston, TX (US)

( * ) Notice: Subject to any disclaimer, the term of this patent is extended or adjusted under 35 U.S.C. 154(b) by 0 days.

(21) Appl. No.: 19/381,217

(22) Filed: Nov. 6, 2025

Related U.S. Application Data

(60) Provisional application No. 63/858,118, filed on Aug. 5, 2025.

(51) Int. Cl.
*B23K 13/02* (2006.01)
*B23K 13/01* (2006.01)
(52) U.S. Cl.
CPC .................................. *B23K 13/025* (2013.01)
(58) Field of Classification Search
CPC ...... B23K 13/025; B23K 13/00; B23K 13/01; F16L 13/02; B29C 65/02; B29C 66/1142; B29C 66/131; B29C 66/5223

USPC ....... 219/612, 615, 616, 617, 629, 635, 643, 219/644

See application file for complete search history.

(56) References Cited

U.S. PATENT DOCUMENTS

| | | | | | |
|---|---|---|---|---|---|
| 3,153,716 | A | * | 10/1964 | Schroeder | B23K 11/18 |
| | | | | | 138/146 |
| 3,427,428 | A | * | 2/1969 | Nelson | B23K 9/0286 |
| | | | | | 219/60 R |
| 6,166,359 | A | * | 12/2000 | Cruickshank | B23K 9/235 |
| | | | | | 219/607 |
| 6,471,249 | B1 | | 10/2002 | Lewis | |
| 7,588,178 | B2 | | 9/2009 | Vennemann et al. | |

FOREIGN PATENT DOCUMENTS

GB          2463694 A       3/2010

* cited by examiner

*Primary Examiner* — Quang T Van
(74) *Attorney, Agent, or Firm* — William R. Childs; Childs Patent Law PLLC

(57) ABSTRACT

Methods of using induction heating and moisture barriers to seam weld tee fittings onto pipelines are disclosed herein. Benefits of the methods can include reducing the duration of the process, avoiding hazardous site conditions, and reducing the risk of hydrogen induced cracking in the circumferential fillet welds.

13 Claims, 5 Drawing Sheets

METHODS OF USING INDUCTION HEATING AND MOISTURE BARRIERS TO PERFORM IN-SERVICE PIPELINE MAINTENANCE

CROSS-REFERENCE TO RELATED APPLICATIONS

This application is a non-provisional application and claims priority to U.S. Provisional Patent Application No. 63/858,118, entitled "METHODS OF USING INDUCTION HEATING AND MOISTURE BARRIERS TO PERFORM IN-SERVICE PIPELINE MAINTENANCE," filed on Aug. 5, 2025, the entirety of which is incorporated by reference.

TECHNICAL FIELD

The present disclosure relates to the field of pipelines as well as products, systems, and methods of repairing or maintaining pipelines when the pipelines are in use and carry a product or fluid within. More specifically, the disclosed subject matter relates to using induction heating and a moisture barrier to facilitate the process of seam welding pipefittings onto pipelines.

BACKGROUND

It is often necessary to cut into a pipeline to tie-in new systems or make repairs while the pipeline is in service and contains product. For example, once a nuclear power reactor is operating, it can be difficult or impossible to quickly stop the reactor. Therefore, it is critical that water used to cool the reactor be allowed to flow unimpeded, even during repairs and maintenance of pipelines. Similarly, stopping production of a liquid or gas pipeline could delay production, resulting in lost profits. Having to stop the use of a water pipeline or a sewage pipeline could result in a loss of service during repairs and require re-sanitization of the entire process apparatus before pumping can resume.

Fortunately, methods have been developed that allow for pipelines to be safely diverted during use so that repairs and maintenance can take place. This process is known in the industry as "hot tapping" or "line stopping." This hot tapping process involves fixing a fitting, such as a tee fitting, around the pipeline, seam welding the longitudinal and the circumferential seams of the tee fitting into place, removing a portion of the pipeline (known as a "coupon") using a hole saw to allow access to the pipeline, and then inserting a plug assembly into the pipeline so as to stop the flow of product from upstream to downstream in the pipeline while diverting that flow of product through the tee fitting to a pipeline or an outlet attached thereto. This procedure can stop the flow of product upstream and downstream of the degraded pipeline, so that the pipeline can be repaired, or a maintenance routine can be performed, with minimal interruption.

Once the downstream repair or maintenance is finished, the process can be reversed. That is, the plug assembly can be withdrawn from the pipeline through the tee fitting, and a completion plug emplaced to seal the pipe. This method restores the flow of the product from the upstream side of the pipeline to the downstream side of the pipe.

Considering the importance of seam welding and line stopping in modern industry, it is desirable to improve the tools, methods, and systems used for seam welding and line stopping so that the processes can be made faster, safer, and more efficient under various field conditions, such as twelve-hour work shifts and interruptions by weather conditions. It remains desirable to provide methods for welding pipeline fittings in place that save time and reduce weld defects.

SUMMARY

A method of welding a tee fitting to a pipeline is disclosed herein. In some embodiments, the method includes providing the pipeline, wherein the pipeline includes an upstream pipeline portion, a downstream pipeline portion, and the pipeline contains a product; and providing a tee fitting, wherein the tee fitting includes or more tee fitting pieces, including a first piece and a second piece, wherein the first piece includes a first piece nozzle including a first piece nozzle opening, a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and positioning a moisture absorbing material between the first piece nozzle opening and the pipeline; and sealing the first piece nozzle opening with a nozzle moisture barrier; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

In some embodiments, the method includes providing the pipeline, wherein the pipeline includes an upstream pipeline portion, a downstream pipeline portion, and the pipeline contains a product; and providing a tee fitting, wherein the tee fitting includes or more tee fitting pieces, including a first piece and a second piece, wherein the first piece includes a first piece nozzle including a first piece nozzle opening, a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge then tack welding the longitudinal seam before seam welding the longitudinal seam; or any combination thereof; and positioning a moisture absorbing material between the first piece nozzle or fitting opening and the pipeline; and sealing the first piece nozzle or fitting opening with a moisture barrier; and heating at least a portion of the first piece bottom edge and the second piece top edge to a longitudinal instillation temperature by induction heating or other heating methods that do not damage the moisture barrier materials; and seam welding at least a portion of the longitudinal seam; and forming an upstream moisture seal by covering the upstream circumferential seam with an upstream moisture barrier; and/or forming a downstream moisture seal by covering the downstream circumferential seam with a downstream moisture barrier; and/or any combination thereof.

In some embodiments, the method further includes removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or circumferential welding the downstream circumferential weld; or tack welding the longitudinal seam before seam welding the longitudinal seam; or any combination thereof. In some embodiments, the method further includes removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential weld. In some embodiments of the method, the pipeline has an internal diameter of about 30.5 cm to about 152.4 cm; or wherein the product flows from an upstream direction to a downstream direction within the pipeline; or wherein the product is flowing from an upstream direction to a downstream direction within the pipeline at a flow rate of from about 4.6 m/s to about 30.5 m/s or from about 3.6 m/s to about 30.5 m/s; or wherein the product has a product temperature, and the pipeline has a pipeline temperature below a weld proceed preheat requirement temperature; or any combination thereof. In some embodiments, the method further includes wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further including: wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours; or wherein first seam welding duration, the second welding duration, and the cooling duration have an aggregate longitudinal seam welding duration of about 12 to about 26 hours; or wherein seam welding the longitudinal seam, includes a first welding duration of from about 4 to about 12 hours, and then forming or re-forming the upstream moisture seal, the downstream moisture seal, or both, during a cooling duration, and then removing the upstream moisture seal, the downstream moisture seal, or both, and then seam welding the longitudinal seam for a second welding duration of from about 4 hours to about 12 hours; or any combination thereof. In some embodiments, the method further includes heating at least a portion of the first piece bottom edge, the second piece top edge, or any combination thereof, by induction heating from ambient temperature to about 121° C. to about 176° C. during a longitudinal preheating duration of about 10-30 minutes; or heating at least a portion of the first piece upstream edge, the second piece upstream edge, or any combination thereof, by induction heating from ambient temperature to about 121° C. to about 176° C. during an upstream preheating duration of about 10-30 minutes; or heating at least a portion of the first piece downstream edge, the second piece downstream edge, or any combination thereof, by induction heating from ambient temperature to about 121° C. to about 176° C. during a downstream preheating duration of about 10-30 minutes; or wherein the longitudinal instillation temperature, the upstream circumferential instillation temperature, or the downstream circumferential instillation temperature, or any combination thereof, is from about 121° C. to about 176° C., wherein the longitudinal instillation temperature, the upstream circumferential instillation temperature, or the downstream circumferential instillation temperature is a surface temperature of a portion the first piece or the second piece, or any combination thereof; or wherein the induction heating source is operated at a power of from about 150 kW to about 200 kW or about 100 kW to about 200 kW, at a frequency of 3 kHz to about 100 kHz, or both; wherein the induction heating source is operated at a power of from about 15 kW to about 120 kW, at a frequency of 3 kHz to about 10 kHz or both; or wherein the induction heating source includes a metal wire enclosed within a rubber tubing, and wherein water flows between the metal wire and an interior of the rubber tubing; or any combination thereof. In some embodiments, the method further includes reducing an amount of moisture under the tee fitting to mitigate or reduce the risk of hydrogen induced cracking in the upstream circumferential seam by forming or maintaining an upstream moisture seal during seam welding at least a portion of the longitudinal seam, circumferential welding the downstream circumferential seam, or both; or reducing an amount of moisture under the tee fitting to mitigate the risk of hydrogen induced cracking in the downstream circumferential seam by forming or maintaining an downstream moisture seal during seam welding at least a portion of the longitudinal seam, circumferential welding the upstream circumferential seam, or both; or any combination thereof. In some embodiments of the method, the moisture absorbing material includes a solid desiccant in an open container; or wherein the moisture absorbing material includes a silica gel, a clay, calcium chloride, sodium chloride, potassium chloride, calcium sulfate, calcium oxide, or any combination or mixture thereof; or wherein the moisture barrier includes a single homogenous film or membrane; or wherein the moisture barrier includes a polymer film, a wax paper, a polyolefin film, a polyvinyl chloride film, a polyethylene film, a paraffin film, a polyvinylidene chloride film, a tape, or any combination thereof; or any combination thereof.

Not all pipe fittings have a nozzle. A method of welding a tee fitting to a pipeline is disclosed herein. In some embodiments, the method includes providing the pipeline, wherein the pipeline includes an upstream pipeline portion, a downstream pipeline portion, and the pipeline contains a product; and providing a tee fitting, wherein the tee fitting includes 2 or more tee fitting pieces, including a first piece and a second piece, wherein the first piece includes a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

In some embodiments, the method further includes removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or tack welding the longitudinal seam before seam welding the longitudinal seam; or any combination thereof. In some embodiments of the method, the pipeline has an internal diameter of about 30.5 cm to about 152.4 cm; or wherein the product flows from an upstream direction to a downstream direction within the pipeline; or wherein the product is flowing from an upstream direction to a downstream direction within the pipeline at a flow rate of from about 4.6 m/s to about 30.5 m/s; or wherein the product has a product temperature, and the product temperature is below an ambient temperature; or any combination thereof. In some embodiments, the method further includes wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further including: wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours; or wherein first seam welding duration, the second welding duration, and the cooling duration have an aggregate longitudinal seam welding duration of about 12 to about 26 hours; or wherein seam welding the longitudinal seam, includes a first welding duration of from about 4 to about 12 hours, and then forming or re-forming the upstream moisture seal, the downstream moisture seal, or both, during a cooling duration, and then removing the upstream moisture seal, the downstream moisture seal, or both, and then seam welding the longitudinal seam for a second welding duration of from about 4 hours to about 12 hours; or any combination thereof. In some embodiments, the method further includes heating at least a portion of the first piece bottom edge, the second piece top edge, or any combination thereof, by induction heating from ambient temperature to about 121° C. to about 176° C. during a longitudinal preheating duration of about 10-30 minutes; or heating at least a portion of the first piece upstream edge, the second piece upstream edge, or any combination thereof, by induction heating from ambient temperature to about 121° C. to about 176° C. during an upstream preheating duration of about 10-30 minutes; or heating at least a portion of the first piece downstream edge, the second piece downstream edge, or any combination thereof, by induction heating from ambient temperature to about 121° C. to about 176° C. during a downstream preheating duration of about 10-30 minutes; or wherein the longitudinal instillation temperature, the upstream circumferential instillation temperature, or the downstream circumferential instillation temperature, or any combination thereof, is from about 121° C. to about 176° C., wherein the longitudinal instillation temperature, the upstream circumferential instillation temperature, or the downstream circumferential instillation temperature is a surface temperature of a portion the first piece or the second piece, or any combination thereof; or wherein the induction heating source is operated at a power of from about 150 kW to about 200 kW, at a frequency of 3 kHz to about 100 kHz, or both; or wherein the induction heating source is operated at a power of from about 15 kW to about 120 kW, at a frequency of 3 kHz to about 10 kHz, or both; or wherein the induction heating source, which includes an induction heating coil, wherein the induction heating coil includes a metal wire enclosed within a rubber tubing, and wherein water flows between the metal wire and an interior of the rubber tubing; or any combination thereof. In some embodiments, the method further includes reducing an amount of moisture under the tee fitting and/or thereby reduces the potential of or likelihood of hydrogen induced cracking in the upstream circumferential seam by forming or maintaining an upstream moisture seal during seam welding at least a portion of the longitudinal seam, circumferential welding the downstream circumferential seam, or both; reducing an amount of moisture under the tee fitting and/or thereby reduces the potential of, or likelihood of, hydrogen induced cracking in the downstream circumferential seam by forming or maintaining a downstream moisture seal during seam welding at least a portion of the longitudinal seam, circumferential welding the upstream circumferential seam, or both; or any combination thereof.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Figure 1:
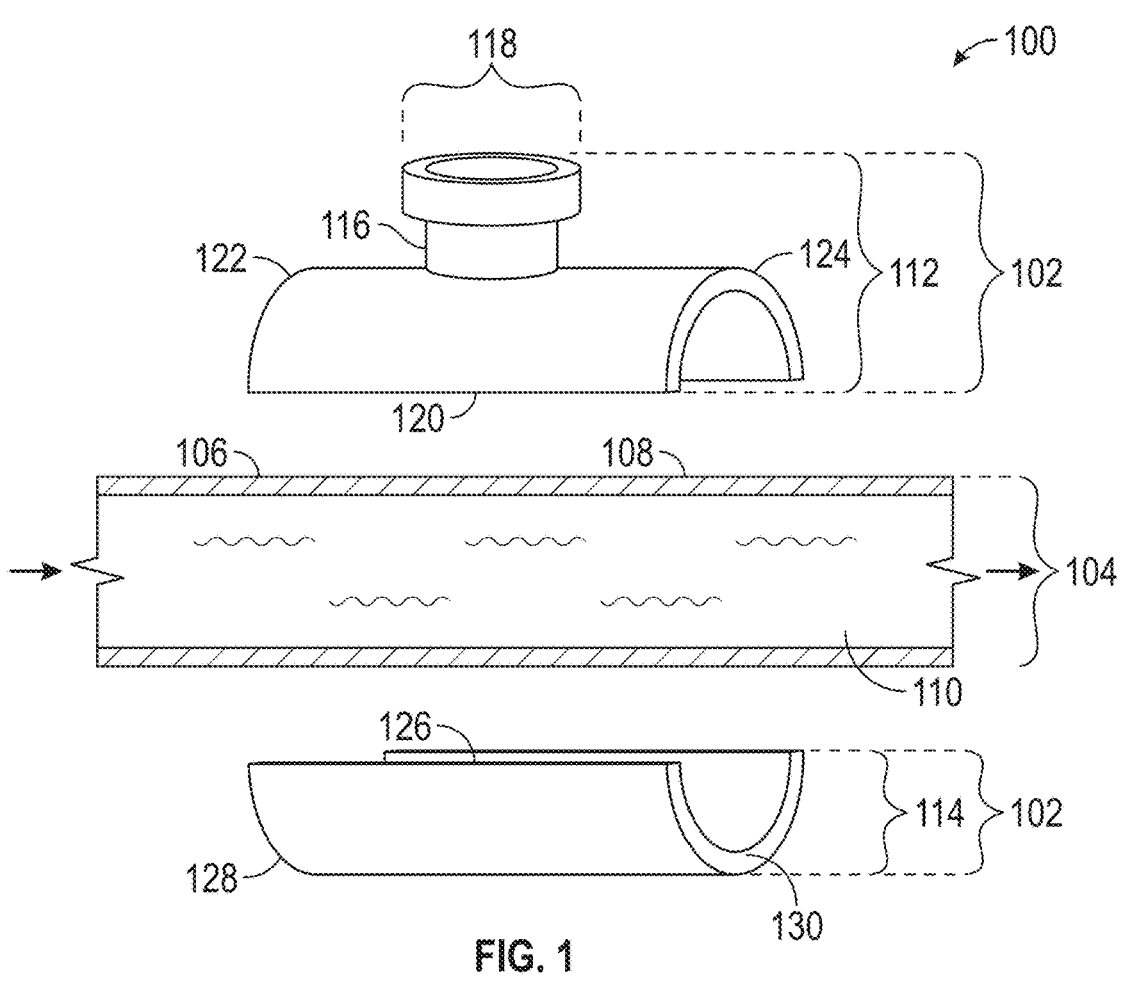
FIG. 1 shows an embodiment of a step of the method disclosed herein by showing a cutaway diagram of pipeline and a schematic illustration of an embodiment of a tee fitting having two separate parts, shown from a side view.

Unless otherwise noted, all measurements are in standard metric units.

Unless otherwise noted, all instances of the words "a," "an," or "the" can refer to one or more than one of the word that they modify.

In this application, the use of "or" means "and/or", unless specifically stated otherwise.

Unless otherwise noted, the use of the term "including", as well as other forms, such as "includes" and "included", is not limiting.

Unless otherwise noted, the use of the term "comprising", as well as other forms, such as "comprise" or "comprises", is not limiting.

Unless otherwise noted, the term "about" refers to ±10% of the non-percentage number that is described, rounded to the nearest number to the accuracy shown. For example, about 105.3 mm, would include 94.8 to 115.8 mm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 100.0 mm to about 200.0 mm would include from 90.0 mm to 220.0 mm.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, when the term "diameter" refers to a circular shape or opening, then the diameter refers to a longest distance across the circular shape or face. When the term "diameter" refers to a shape or opening having a non-circular shape, then the term "diameter" refers to a longest distance across the non-circular shape or opening. Examples of non-circular shapes include an oval or ellipse, a square, a hexagon, an octagon, or any polygon.

Unless otherwise noted, the term "product" refers to a substance contained within a pipeline, and the product can be a fluid, liquid, gas, condensate, or slurry or can have any form capable of flowing from an upstream direction to a downstream direction.

Unless otherwise noted, "seam" and "seem" are used interchangeably, and refer to a point, line, or area of contact between two or more objects.

Unless otherwise noted, the phrase "forming a seam" refers to bringing two or more objects together, forming a point, line, or area of contact between or among the two or more objects.

Unless otherwise noted, the phrases "seam welding" or "welding" are used interchangeably and refer to forming a continuous seam deposit by welding two or more objects together along about 80% to 100% of a seam between or among the objects.

Unless otherwise noted, the phrases "tack weld," "tack welding," or "tack welded" refers to forming a discontinuous seam deposit between or among two or more objects by welding the two or more objects together along 5% to about 20% a seam between the objects. It is understood that tack welded deposits can be converted into a seam welded deposit by seam welding.

Unless otherwise noted, the phrases "longitudinal seam", "L seam," "horizontal seam," "long seam" or "main seam" are used interchangeably and refer to a seam that runs about parallel to the pipeline being fitted and/or is the longest seam formed when two or more tee fitting pieces pressed together, regardless of the orientation of the pipeline.

Unless otherwise noted, the phrases "circumferential seam," "C seam" or "vertical seam" are used interchangeably and refer to a seem that wraps around the circumference of the pipeline being fitted, regardless of the orientation of the pipeline.

Unless otherwise noted, the term "tee fitting" or "pipeline fitting" refer to a component used to connect sections of pipeline, change direction of a pipeline, or alter the pipeline system's size or shape. The term "tee fitting" does require a nozzle and does not require that, if a nozzle is present, that the nozzle be at a right angle to the pipe or pipeline being fitted. The terms "tee fitting" or "pipe fitting" or "pipeline fitting" or "fitting" can be used interchangeably throughout this disclosure, including substituting one term for the other.

Unless otherwise noted, the term "moisture" refers to water vapor present under ambient conditions, such as humidity and/or condensation of water from the air. Moisture does not refer to water present in the product or liquid water located outside of the pipeline, such as underwater welding.

Unless otherwise noted, measured properties (height, width, length, ratio etc.) as described herein are understood to be averaged measurements. For example, when measuring a length between two points, the average length can be ascertained by measuring the length three times and dividing the aggregate length by three to yield the averaged length.

Unless otherwise noted, the terms "upstream" and "downstream", except when referring to the pipeline or product flowing therein, merely refer to which way a piece or part of a piece are facing, and therefore they can be substituted with the term "right" of "left." This is because the methods disclosed herein do not depend on which direction of the pipeline is downstream. Therefore, the phrase "a first piece upstream side edge, a first piece downstream side edge" merely refers to which edge is facing in which direction. These terms could be substituted with "a first piece left side edge, a first piece right side edge."

Unless otherwise noted, the terms "first," "second," and "third" are arbitrary designators of convenience that distinguish which object or which part of an object are being referred to; they do not necessarily refer to any order or sequence. For example, the disclosure may recite "a first piece and a second piece" and then recite "the second piece includes a second piece top edge, a second piece upstream side edge, and a second piece downstream side edge." However, when referring to four embodiments of pieces of the tee fitting pieces, then specific pieces and the specific fitting piece can be referred to as a "wherein the first piece includes a first piece top edge, a first piece upstream side edge, and a first piece downstream side edge," a "wherein the second piece includes a second piece top edge, a second piece upstream side edge, and a second piece downstream side edge," a "wherein the third piece includes a third piece top edge, a third piece upstream side edge, and a third piece downstream side edge," and a "wherein the fourth piece includes a fourth piece top edge, a fourth piece upstream side edge, and a fourth piece downstream side edge," etc., for as many pieces as are numbered. In other words, the term "first", "second", "third" and the like can be inserted in front of objects herein to refer to any embodiment of a tee fitting piece or any part of tee fitting piece described herein, even if not specifically referred to as a first tee fitting piece or a first tee fitting piece bottom edge. When describing two or more tee fitting pieces, this terminology clearly indicates which piece and which part of the piece is being referred to.

Unless otherwise noted, ranges of easily varied measurements, such as length, width, and height, weight, pressure, temperature, voltage, power, and frequency refer to every integer within the range, sub-ranges, and combinations thereof. For example, from 1.0 mm to 5.0 mm in length, refers to 1.0 mm, 2.0 mm, 3.0 mm, 4.0 mm, 5.0 mm, ranges of 1.0 mm to 3.0 mm, 3.0 mm to 4.0 mm, and combinations and sub-combinations thereof.

Conventional methods for seam welding tee fittings onto pipelines take place under field conditions, which often include performing the operation outdoors in a remote location without the benefit of an enclosure or climate control to protect workers or the parts and equipment against weather conditions. Conventional seam welding methods can include pre-heating the seams before the seam welding begins. In more detail, conventional seam welding uses resistance heating to pre-heat the seams by attaching elaborate meshes of wires directly to the metal along the seams of the pipeline and tee fitting. This process of attaching wires often takes around 36 hours to put the mesh of wires in place around each seam to be welded. Once the wires are in place, the pre-heating step itself can take hours until the seams are ready for seam welding. This conventional resistance heating method suffers from frequent burnouts. Also, the resistance heating method requires so many wires close to the welding site that it presents a safety issue due to the creation of a tripping or entanglement hazard, especially if the area needs to be evacuated quickly. Further, the process of welding the longitudinal or circumferential seam often takes more than one eight-hour shift, so one or more portions of the wire mesh need to be detached, removed so the seams can cool during the work stoppage, and reattached during the next shift, so that the seams can be preheated to welding temperatures. Using this conventional method of seam welding a tee fitting to a pipeline having an internal diameter of 152.4 cm can take from several days to a week. Further, conventional methods make no effort to exclude moisture in between welding sessions.

A process has been discovered that overcomes these problems. It has been discovered that induction heating can be used under field conditions to preheat the seams of a fitting, such as a tee fitting, radically reducing the time necessary for preheating the seams for welding. For example, induction heating can take as little as two to three hours to place the induction heating coils into contact with the seams to be welded. Once the preheating begins, induction heating can preheat the seams to an acceptable welding temperature in about 20 minutes. Further, induction heating uses fewer connections to preheat the seams, avoiding or reducing the numerous wires near the work site. This reduction of the number of wires makes the use of induction heating significantly safer than the use of wires for resistance heating by avoiding or reducing a potential tripping or entanglement hazard.

Moreover, the use of induction heating to preheat the seams before seam welding significantly reduces the set-up time. Embodiments of the method disclosed herein can reduce the time for welding the fitting to the pipeline from 6 days to just 3 days or 3-5 twelve-hour shifts, saving time and money as well as avoiding or reducing the hazards of prolonged exposure of workers to field conditions.

Another disadvantage of wire resistance heating, used in convention methods, is that it heats from the outside in and due to the cooling effect of the flowing product the inside of the fitting may not reach the required weld procedure preheat temperature. Whereas Induction Heating, as used in embodiments of the method disclosed herein, heats from the inside out, and once the preheat temperature is measured at the outside surface, the inside surface temperature has high confidence that the required temperature is reached and maintained.

Moreover, the use of induction heating to preheat the seams before seam welding significantly reduces the set-up time. Embodiments of the method disclosed herein can reduce the time for welding the fitting to the pipeline from 6 days to just 3 days or 3-5 twelve-hour shifts, saving time and money as well as avoiding or reducing the hazards of prolonged exposure of workers to field conditions.

Another advantage of induction heating is that this technology heats from inside to outside, whereas resistance heats from outside to inside. Therefore, without the proper soke time or radiating power, the inside of the fitting may never reach the desired controlled preheat temperature. As the surface temperature is the recorded temperature, there is no real proof that the internal interface temperature will meet the Welding Procedure Specification (WPS) requirements.

It has been further discovered that it is possible to preheat seams faster, weld seams faster, and reduce crack formation along the circumferential seam welds by using moisture barriers, and, if the tee fitting includes a nozzle, positioning a moisture absorbing material between the pipeline and the moisture barrier covering the nozzle opening. Conventional methods of installing tee fittings to pipelines allow the seams to cool during a work stoppage. Under field conditions, the cooling of the seams causes the seams to absorb moisture, which can slow heating and cause hydrogen cracking during the welding of the circumferential seams. This problem is even more pronounced if the pipeline has a temperature below the welding temperature because moisture condenses faster along cooler surfaces. For example, the methods disclosed herein can be particularly advantageous where the rate of product flow is from about 4.6 m/s to about 30.5 m/s or the product is a physically cooler material such as water or a cryogenic fluid. It has also been discovered that the application of moisture barriers and/or a moisture absorbing material allows for the circumferential seams to be preheated and seam welded more quickly.

In some embodiments, the moisture seal is beneficially utilized in fitting installations where the pipeline flow rate is causing condensation to form (sweating) or where the flow rate causes a rapid cooling of the weld members, resulting in a degraded weld joint. To mitigate sweating or high cooling rate, a controlled preheat is applied to the fitting to overcome the quenching effect caused by the high flow rate of the product in the line. In essence, the moisture seal is employed to seal the openings and introduce a container of moisture-absorbent material that wicks away any residual condensation that may develop during the cooling cycle at the conclusion of the work shift.

In more detail, a method of welding a tee fitting to a pipeline is disclosed herein. In some embodiments, referring to FIG. 1, an illustration of a step 100 of the method of welding a tee fitting 102 to a pipeline 104 includes providing the pipeline, wherein the pipeline includes an upstream pipeline portion 106, a downstream pipeline portion 108, and the pipeline contains a product 110. In some embodiments, the method includes providing a tee fitting, wherein the tee fitting includes 2 or more tee fitting pieces, including a first piece 112 and a second piece 114, wherein the first piece includes a first piece nozzle 116 including a first piece nozzle opening 118, a first piece bottom edge 120, a first piece upstream side edge 122, a first piece downstream side edge 124, and wherein the second piece includes a second piece top edge 126, a second piece upstream side edge 128, and a second piece downstream side edge 130, wherein the first piece bottom edge has a shape that fits or complements the second piece top edge.

Figure 2:
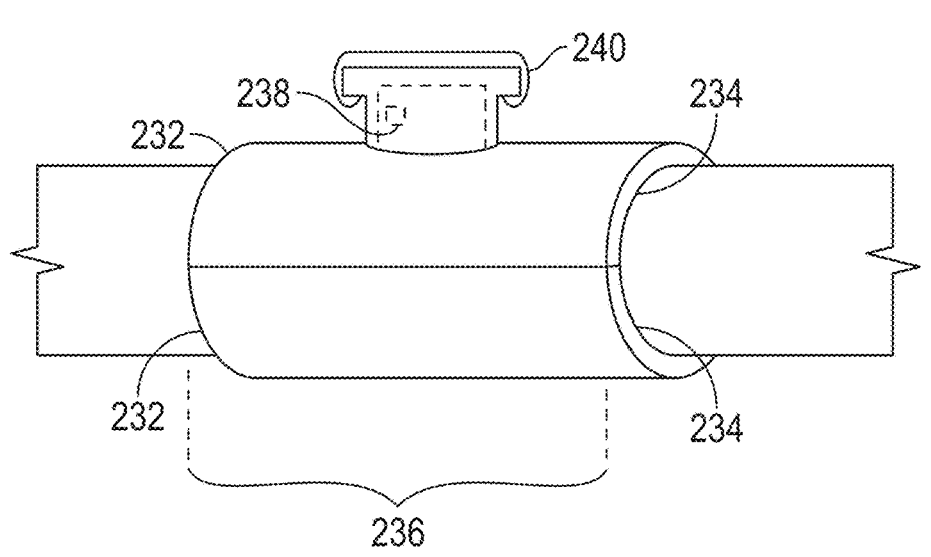
FIG. 2 shows an embodiment of a step of the method disclosed herein by presenting a schematic illustration of the tee fitting shown in FIG. 1, wherein the two parts of the tee fitting are pressed together around the pipeline, forming a longitudinal seam and two circumferential seams for welding.

Referring to FIG. 2, a step 200 of the method of welding a tee fitting to the pipeline of FIG. 1 includes, forming an upstream circumferential seam 232 by bringing the first piece upstream side edge and the second piece upstream side edge into contact with the upstream pipeline portion, and forming a downstream circumferential seam 234 by bringing the first piece downstream side edge and the second piece downstream side edge into contact with the downstream pipeline portion. In some embodiments, the method includes forming a longitudinal seam 236 by bringing the first piece bottom edge into contact with the second piece top edge. Further, the method includes positioning a moisture absorbing material 238 between the first piece nozzle opening and the pipeline and sealing the first piece nozzle opening with a nozzle moisture barrier 240.

Figure 3A:
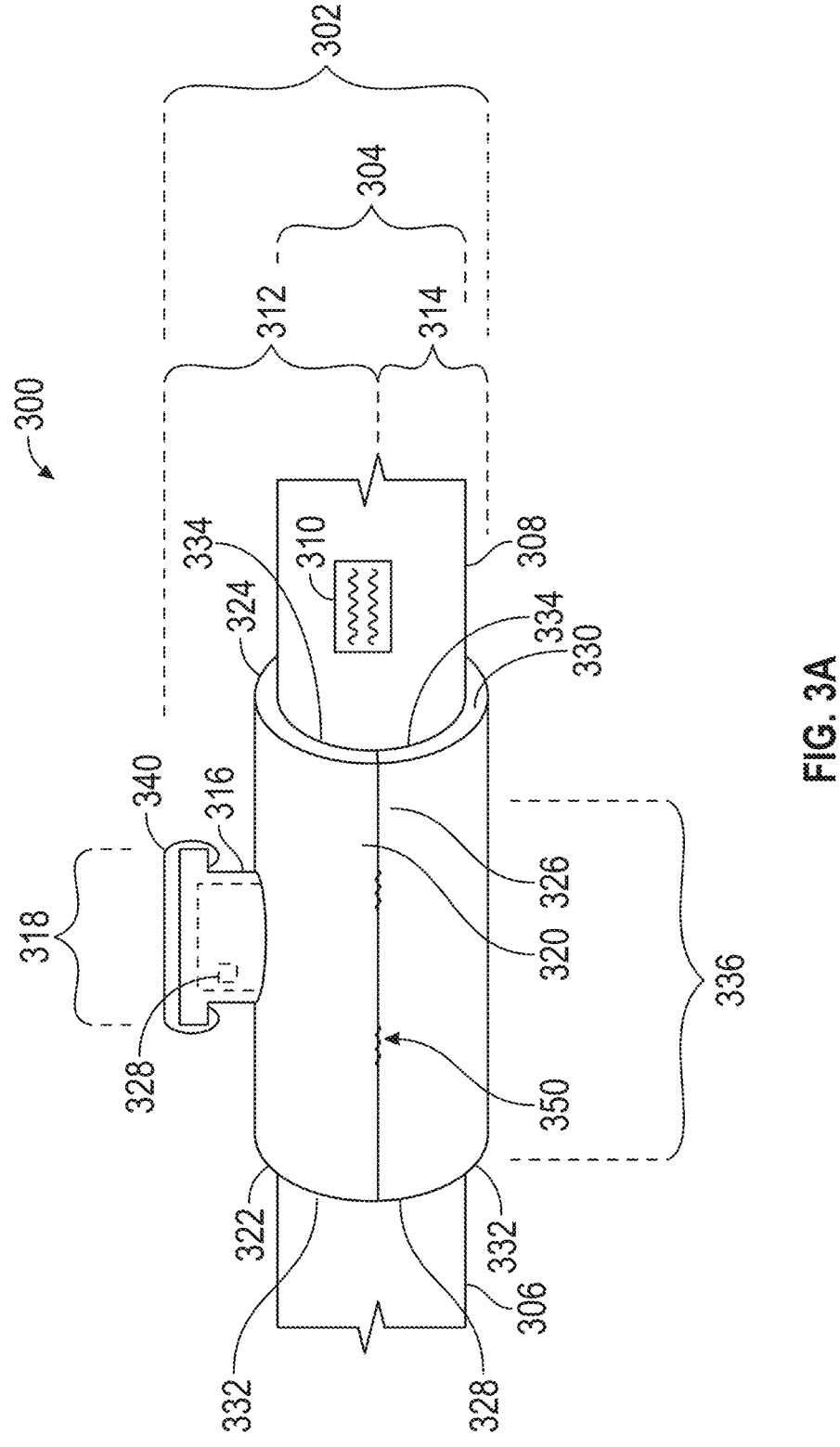
FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, shows an embodiment of several steps of the method disclosed herein by showing the tee fitting of FIG. 2 as it progresses through several steps.

In some embodiments, referring to FIG. 3A, a step 300 of the method of welding a tee fitting 302 to a pipeline 304 includes providing the pipeline 304, wherein the pipeline includes an upstream pipeline portion 306, a downstream pipeline portion 308, and the pipeline contains a product 310. In some embodiments, the method includes providing a tee fitting, wherein the tee fitting includes 2 or more tee fitting pieces, including a first piece 312 and a second piece 314, wherein the first piece includes a first piece nozzle 316 including a first piece nozzle opening 318, a first piece bottom edge 320, a first piece upstream side edge 322, a first piece downstream side edge 324, and wherein the second piece includes a second piece top edge 326, a second piece upstream side edge 328, and a second piece downstream side edge 330, wherein the first piece bottom edge has a shape that fits or complements the second piece top edge. In some embodiments, the method includes forming an upstream circumferential seam 332 by bringing the first piece upstream side edge and the second piece upstream side edge into contact with the upstream pipeline portion, and forming a downstream circumferential seam 334 by bringing the first piece downstream side edge and the second piece downstream side edge into contact with the downstream pipeline portion. In some embodiments, the method includes forming a longitudinal seam 336 by bringing the first piece bottom edge into contact with the second piece top edge. In some embodiments, the method includes positioning a moisture absorbing material 338 between the first piece nozzle opening and the pipeline. In some embodiments, the method includes sealing the first piece nozzle opening with a nozzle moisture barrier 340.

In some embodiments, the method includes tack welding the longitudinal seam before seam welding the longitudinal seam. In some embodiments, the method includes forming one or more, two or more, or three or more tack weld deposits 350 along the longitudinal seam before seam welding the longitudinal seam. In some embodiments of the method, the tack welding occurs before, during, or after positioning a moisture absorbing material 238 between the first piece nozzle opening and the pipeline. In some embodiments, the method includes sealing the first piece nozzle opening with a nozzle moisture barrier 240. FIG. 3B, FIG. 3C, FIG. 3D, FIG. 3E, FIG. 3F, FIG. 3G, FIG. 3H, FIG. 3I, FIG. 3J, FIG. 3K, and FIG. 3L show an embodiment of the set-up show in Fig. A as taken through an embodiment of steps of the method disclosed herein.

Figure 3B:
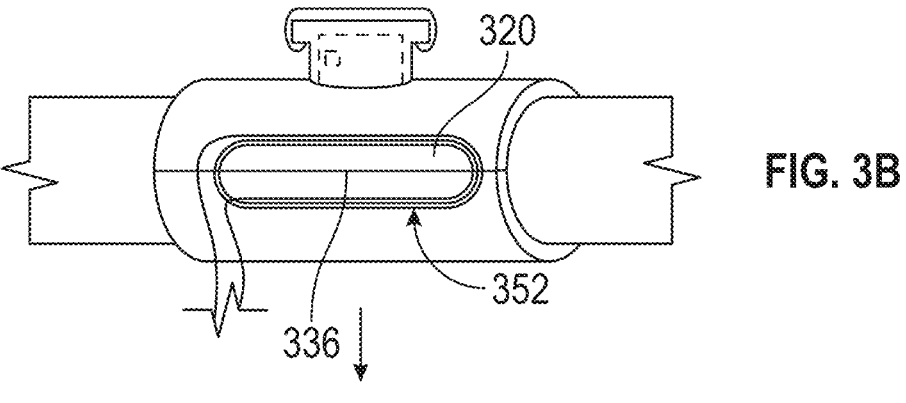

Referring to FIG. 3B, in some embodiments, the method step 300 includes heating at least a portion of the first piece bottom edge 320 and the second piece top edge to a longitudinal instillation temperature by induction heating. In some embodiments of the method, the longitudinal seam is preheated by bringing an induction heating source 352 into contact with the longitudinal seam, including the at least a portion of the first piece bottom edge and the second piece top edge.

Figure 3C:
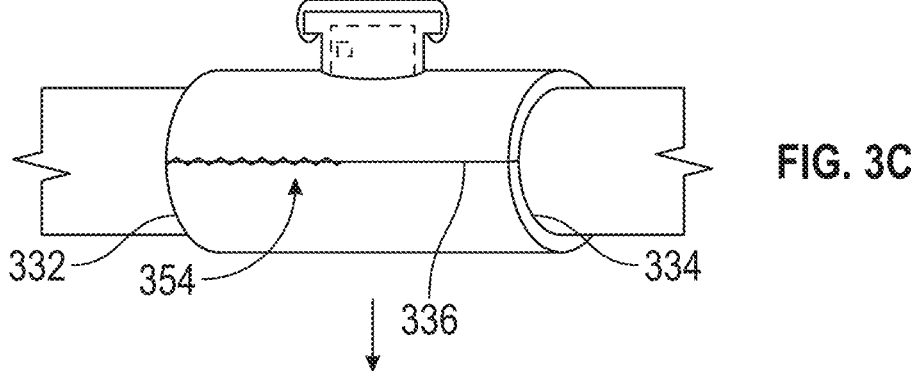

Referring to FIG. 3C, in some embodiments, seam welding at least a portion of the longitudinal seam 336. In some embodiments, the method includes forming a partial longitudinal weld deposit 354 along the longitudinal weld seam. For example, a partial longitudinal weld deposit, as opposed to a complete longitudinal weld deposit, would be formed when a work stoppage requires stopping the longitudinal seam weld step. In some embodiments, referring to FIG. 3F, the method includes forming a complete longitudinal weld deposit 355 along the longitudinal weld seam, such that method could proceed directly to FIG. 3F without needing to pass through the steps illustrated in FIG. 3D and FIG. 3E.

Although depicted in FIG. 3C as being seam welded from left to right, or upstream to downstream, it is understood that direction of seam welding the longitudinal seam, or forming a longitudinal weld deposit along the longitudinal weld seam, is arbitrary and could take place in either direction.

In some embodiments, the method includes, seam welding the longitudinal seam from the upstream circumferential seam to the downstream circumferential seam. In some embodiments, the method includes seam welding the longitudinal seam from the downstream circumferential seam to the upstream circumferential seam. In some embodiments, the method includes seam welding the longitudinal seam from a portion of the longitudinal seam located between the upstream circumferential seam and the downstream circumferential seam and seam welding the longitudinal seam outward toward the upstream circumferential seam and the downstream circumferential seam. In some embodiments, the method includes seam welding the longitudinal seam from the upstream circumferential seam and the downstream circumferential seam inward toward a portion of the longitudinal seam between the upstream circumferential seam and the downstream circumferential seam. It is understood that the seam welding of the longitudinal seam can take place before, during, or after seam welding another longitudinal seam on the other side of the fitting (not shown).

Figure 3D:
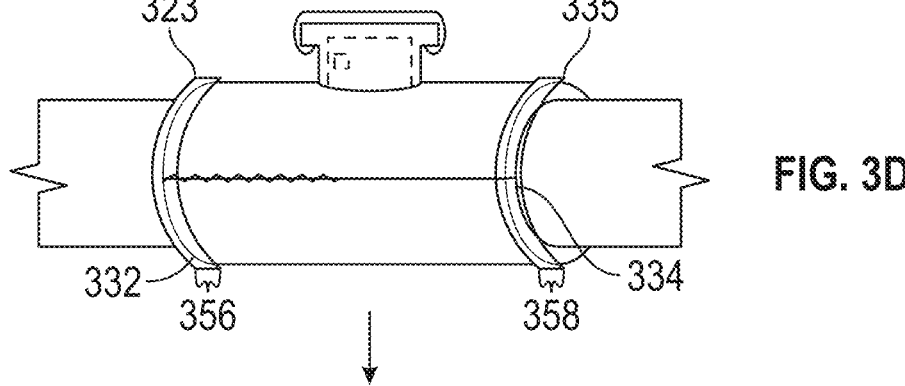

In embodiments of the method where seam welding the longitudinal seam does not occur during a single step or where a partial longitudinal weld deposit 354 is formed, then, referring to FIG. 3D, the circumferential seams would be allowed to cool and then be sealed by a moisture barrier. In some embodiments, the method includes forming an upstream moisture seal 356 by covering the upstream circumferential seam 332 with an upstream moisture barrier. In some embodiments, the method includes forming a downstream moisture seal 358 by covering the downstream circumferential seam 334 with a downstream moisture barrier.

Figure 3E:
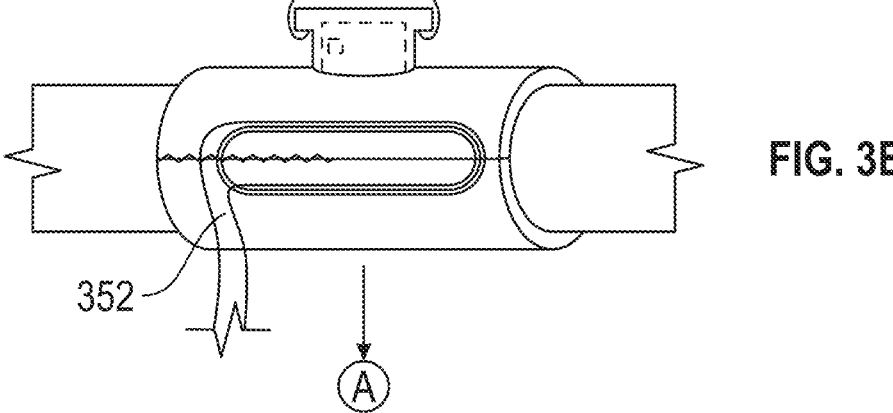

In some embodiments of the method, before seam welding the longitudinal seam can resume, referring to FIG. 3E, the moisture barriers covering the circumferential seam would be removed and the longitudinal seam would be preheated or reheated by bringing an induction heating source 352 into contact with the longitudinal seam.

In some embodiments, the method includes heating or reheating at least a portion of the first piece bottom edge and the second piece top edge to a longitudinal instillation temperature by induction heating by bringing an induction heating source 352 into contact with the longitudinal seam.

In some embodiments, the seam welding of the longitudinal seam can be performed during two seam welding sessions, where the seam weld deposits are illustrated as being half formed during each step. However, in some embodiments, the steps depicted in FIG. 3C and FIG. 3D can be performed multiple times until the longitudinal seam is completely seam welded or until the longitudinal seam deposit is formed along the whole longitudinal seam. The direction of welding the longitudinal seam is arbitrary, so it is understood that the longitudinal seam can be seam welded from right to left, left to right, upstream to downstream, or downstream to upstream, as the direction of welding is arbitrary.

Figures 3F, 3G, 3H, 3I:
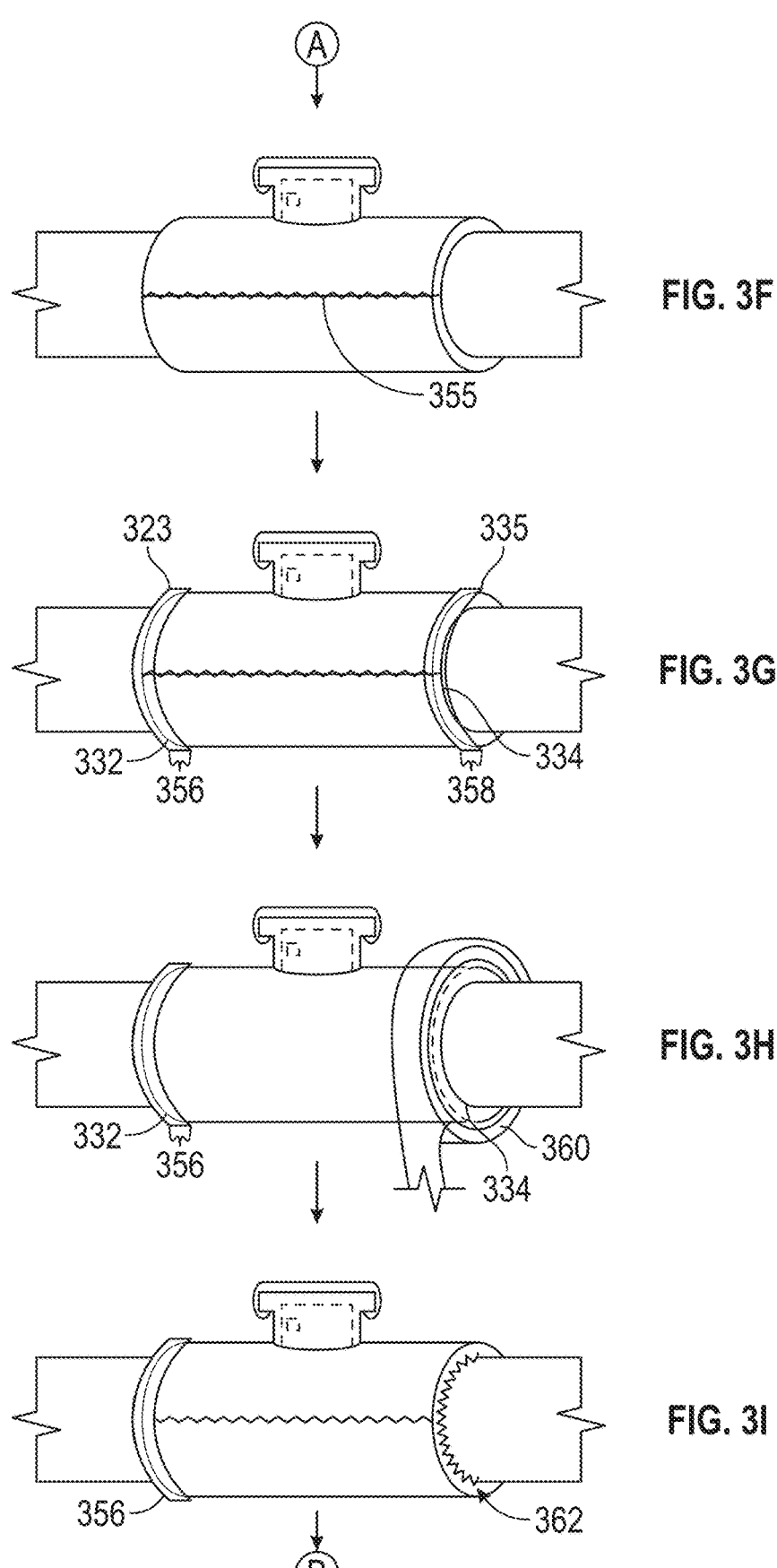

Referring to FIG. 3F, in some embodiments, the method includes seam welding at least a portion of the longitudinal seam or forming a complete longitudinal weld deposit 355 from the downstream circumferential seam to the upstream circumferential seam.

Referring to FIG. 3G, in some embodiments, even after the longitudinal seam deposit has been completely formed along the whole longitudinal seam, the step of forming an upstream moisture seal 356 by covering the upstream circumferential seam 332 with an upstream moisture barrier 323 and forming a downstream moisture seal 358 by covering the downstream circumferential seam 334 with a downstream moisture barrier 335 is desirable to reduce or avoid collection of moisture in or around the circumferential seams.

To seam weld the circumferential seams, the moisture barrier should be removed from the circumferential seam undergoing seam welding while maintaining the other moisture barrier around the other circumferential seam. This step of maintaining the moisture barrier around the other circumferential seam protects that circumferential seam from collecting moisture.

Referring to FIG. 3H, in some embodiments, the method includes removing the downstream moisture seal and heating the downstream circumferential seam by induction heating the first piece downstream edge by bringing an induction heating source 360 into contact with the downstream circumferential seam while maintaining upstream moisture seal 356 around the upstream circumferential seam 332.

Referring to FIG. 3I, in some embodiments, the method includes seam welding or circumferential welding the downstream circumferential seam, forming a downstream circumferential weld deposit 362.

It is understood that the choice of which moisture barrier to remove first and which circumferential seam to seam weld, left or right, upstream or downstream, is arbitrary. It is understood that the choice of which direction to seam weld a circumferential seam is arbitrary. It is understood that not all embodiments of the methods disclosed herein are shown in the drawings. For example, a tee or flange can be welded to a fitting.

In some embodiments, the first step could be removing the upstream moisture seal, and heating the upstream circumferential seam by induction heating the first piece upstream edge, the second piece upstream edge, or both, to an upstream circumferential instillation temperature (not shown).

Figures 3J, 3K, 3L:
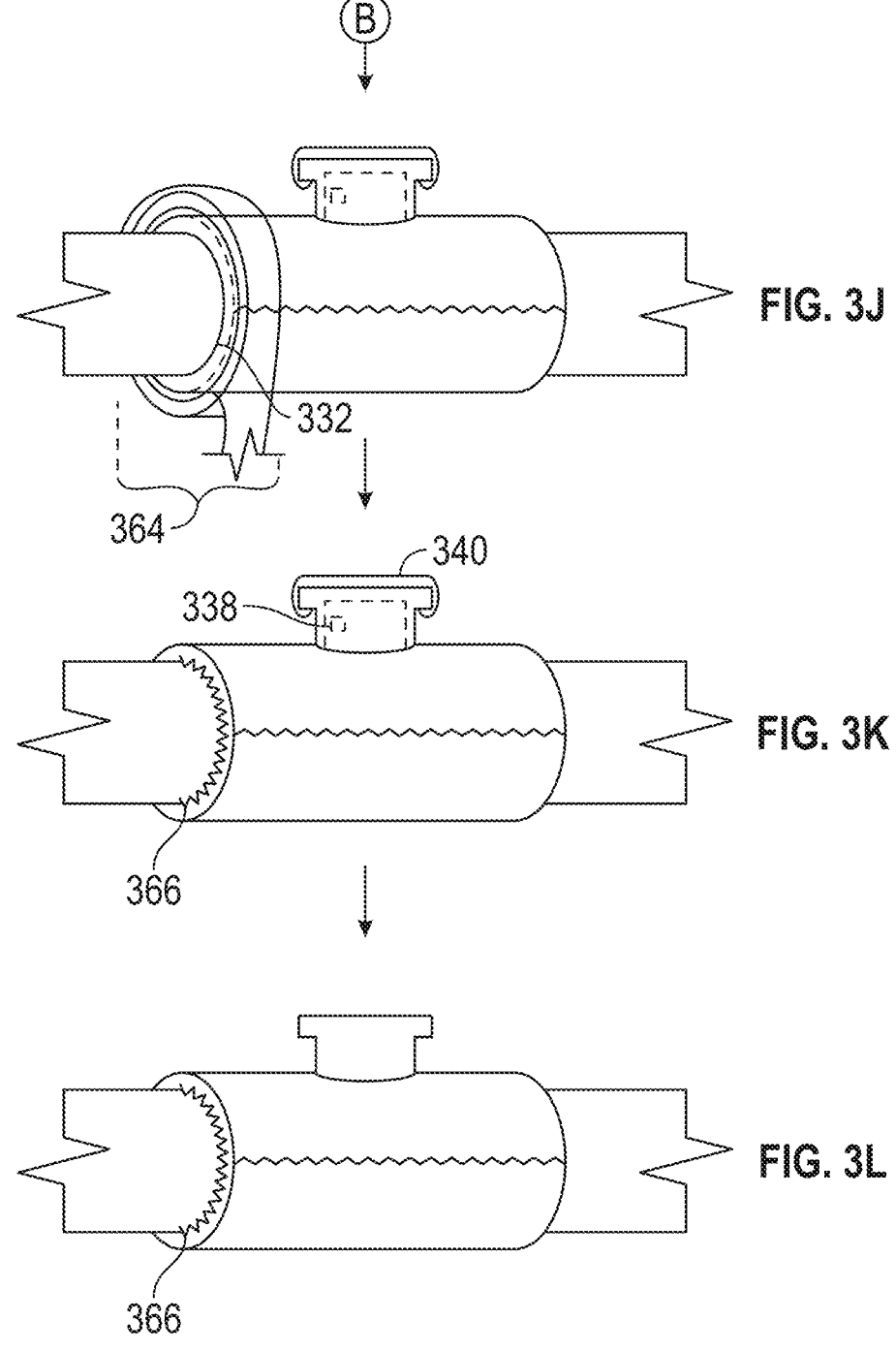

Referring to FIG. 3J, in some embodiments, the method includes removing the upstream moisture seal, and heating the upstream circumferential seam by induction heating the first piece upstream edge, the second piece upstream edge, or both, to an upstream circumferential instillation temperature by bringing an induction heating source 364 into contact with the upstream circumferential seam.

Referring to FIG. 3K, in some embodiments, the method includes circumferential welding the upstream circumferential seam, forming an upstream circumferential seam deposit 366.

Referring to FIGS. 3K and 3L, in some embodiments, the method includes removing the moisture barrier 340 and/or moisture absorbing material 338 from the tee fitting nozzle, providing the installed tee fitting.

In some embodiments, the method of welding a tee fitting to a pipeline includes providing the pipeline, wherein the pipeline includes an upstream pipeline portion, a downstream pipeline portion, and the pipeline contains a product; and providing two or more pieces of a tee fitting, forming a left circumferential seam, a right circumferential seam, and a longitudinal seam by bringing two or more pieces of the tee fitting into contact with the pipeline; positioning a moisture absorbing material between a first piece nozzle opening of a first piece and the pipeline, and heating the longitudinal seam by induction heating. In some embodiments, the method includes seam welding at least a portion of the longitudinal seam. In some embodiments, the seam welding of the longitudinal seam can proceed from right to left, left to right, center to edges, or edges to center. In some embodiments, the method includes allowing the longitudinal seam to cool and then forming a moisture barrier around the left and right circumferential seam. In some embodiments, the left and/or right circumferential seam are removed as needed to continue longitudinal seam welding. In some embodiments, after the longitudinal seam is seam welded, then the left or right moisture barrier can be removed. In some embodiments, if the left moisture barrier is removed, then the right moisture barrier is kept in place, and the left circumferential seam is seam welded. In some embodiments, if the right moisture barrier is removed, then the left moisture barrier is kept in place, and the right circumferential seam is seam welded. In some embodiments, the moisture barrier is maintained over a nozzle of the tee fitting and a moisture barrier is maintained over the circumferential seams whenever those seams are not being seam welded.

In some embodiments of the method, the method includes a product. In some embodiments of the method, the method excludes a product. In some embodiments, the method includes providing a pipeline or pipe.

In some embodiments, the method further includes wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further including: wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours. In practical terms, embodiments of the method can include a 24-hour duration over two dayshifts. The fillet weld moisture seams are applied at the end of the shift to both ends. The moisture seals are removed for both end fillet welds at the start of the new shift to complete the longitudinal seam weld. After the longitudinal seam weld is complete, the moisture seals are reapplied to both ends of the fitting.

In More Detail

Embodiment 1. A method of welding a tee fitting to a pipeline, comprising:

providing the pipeline, wherein the pipeline includes an upstream pipeline portion, a downstream pipeline portion, and the pipeline contains a product; and providing a tee fitting, wherein the tee fitting includes or more tee fitting pieces, including a first piece and a second piece, wherein the first piece includes a first piece nozzle including a first piece nozzle opening, a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and positioning a moisture absorbing material between the first piece nozzle opening and the pipeline; and sealing the first piece nozzle opening with a nozzle moisture barrier; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

Embodiment 2. The method of one or more of embodiments 1-7 and 14-15, further comprising;

removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or tack welding the longitudinal seam before seam welding the longitudinal seam; or any combination thereof.

Embodiment 3. The method of one or more of embodiments 1-7 and 14-15, wherein the pipeline has an internal diameter of about 30.5 cm to about 152.4 cm; or wherein the product flows from an upstream direction to a downstream direction within the pipeline; or wherein the product is flowing from an upstream direction to a downstream direction within the pipeline at a flow rate of from about 4.6 m/s to about 30.5 m/s; or wherein the product has a product temperature, and the pipeline has a pipeline temperature below a weld proceed preheat requirement temperature; or any combination thereof.

Embodiment 4. The method of one or more of embodiments 1-7 and 14-15, further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours; or wherein first seam welding duration, the second welding duration, and the cooling duration have an aggregate longitudinal seam welding duration of about 12 to about 26 hours; or wherein seam welding the longitudinal seam, includes a first welding duration of from about 4 to about 12 hours, and then forming or re-forming the upstream moisture seal, the downstream moisture seal, or both, during a cooling duration, and then removing the upstream moisture seal, the downstream moisture seal, or both, and then seam welding the longitudinal seam for a second welding duration of from about 4 hours to about 12 hours; or any combination thereof.

Embodiment 5. The method of one or more of embodiments 1-7 and 14-15, further comprising:

heating at least a portion of the first piece bottom edge, the second piece top edge, or any combination thereof, by induction heating from ambient temperature to about 121° C. to about 176° C. during a longitudinal preheating duration of about 10-30 minutes; or heating at least a portion of the first piece upstream edge, the second piece upstream edge, or any combination thereof, by induction heating from ambient temperature to about about 121° C. to about 176° C. during an upstream preheating duration of about 10-30 minutes; or heating at least a portion of the first piece downstream edge, the second piece downstream edge, or any combination thereof, by induction heating from ambient temperature to about 121° C. to about 176° C. during a downstream preheating duration of about 10-30 minutes; or wherein the longitudinal instillation temperature, the upstream circumferential instillation temperature, or the downstream circumferential instillation temperature, or any combination thereof, is from about 121° C. to about 176° C., wherein the longitudinal instillation temperature, the upstream circumferential instillation temperature, or the downstream circumferential instillation temperature is a surface temperature of a portion the first piece or the second piece, or any combination thereof; or wherein the induction heating source is operated at a power of from about 15 kW to about 120 kW, at a frequency of 3 kHz to about 10 kHz or both; or wherein the induction heating source includes a metal wire enclosed within a rubber tubing, and wherein water flows between the metal wire and an interior of the rubber tubing; or any combination thereof.

Embodiment 6. The method of one or more of embodiments 1-7 and 14-15, further comprising;

reducing an amount of moisture under the tee fitting to mitigate the risk of hydrogen induced cracking in the upstream circumferential seam by forming or maintaining an upstream moisture seal during seam welding at least a portion of the longitudinal seam, circumferential welding the downstream circumferential seam, or both; or reducing an amount of moisture under the tee fitting to mitigate the risk of hydrogen induced cracking in the downstream circumferential seam by forming or maintaining an downstream moisture seal during seam welding at least a portion of the longitudinal seam, circumferential welding the upstream circumferential seam, or both; or any combination thereof.

Embodiment 7. The method of one or more of embodiments 1-7 and 14-15, wherein the moisture absorbing material includes a solid desiccant in an open container; or wherein the moisture absorbing material includes a silica gel, a clay, calcium chloride, sodium chloride, potassium chloride, calcium sulfate, calcium oxide, or any combination or mixture thereof; or wherein the moisture barrier includes a single homogenous film or membrane; or wherein the moisture barrier includes a polymer film, a wax paper, a polyolefin film, a polyvinyl chloride film, a polyethylene film, a paraffin film, a polyvinylidene chloride film, a tape, or any combination thereof; or any combination thereof.

Embodiment 8. A method of welding a tee fitting to a pipeline, comprising:

providing the pipeline, wherein the pipeline includes an upstream pipeline portion, a downstream pipeline portion, and the pipeline contains a product; and providing a tee fitting, wherein the tee fitting includes 2 or more tee fitting pieces, including a first piece and a second piece, wherein the first piece includes a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

Embodiment 9. The method of one or more of embodiments 8-15, further comprising;

removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or tack welding the longitudinal seam before seam welding the longitudinal seam; or any combination thereof.

Embodiment 10. The method of one or more of embodiments 8-15, wherein the pipeline has an internal diameter of about 30.5 cm to about 152.4 cm; or wherein the product flows from an upstream direction to a downstream direction within the pipeline; or wherein the product is flowing from an upstream direction to a downstream direction within the pipeline at a flow rate of from about 4.6 m/s to about 30.5 m/s; or wherein the product has a product temperature, and the product temperature is below an ambient temperature; or any combination thereof.

Embodiment 11. The method of one or more of embodiments 8-15, further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours; or wherein first seam welding duration, the second welding duration, and the cooling duration have an aggregate longitudinal seam welding duration of about 12 to about 26 hours; or wherein seam welding the longitudinal seam, includes a first welding duration of from about 4 to about 12 hours, and then forming or re-forming the upstream moisture seal, the downstream moisture seal, or both, during a cooling duration, and then removing the upstream moisture seal, the downstream moisture seal, or both, and then seam welding the longitudinal seam for a second welding duration of from about 4 hours to about 12 hours; or any combination thereof.

Embodiment 12. The method of one or more of embodiments 8-15, further comprising:

heating at least a portion of the first piece bottom edge, the second piece top edge, or any combination thereof, by induction heating from ambient temperature to about 121° C. to about 176° C. during a longitudinal preheating duration of about 10-30 minutes; or heating at least a portion of the first piece upstream edge, the second piece upstream edge, or any combination thereof, by induction heating from ambient temperature to about 121° C. to about 176° C. during an upstream preheating duration of about 10-30 minutes; or heating at least a portion of the first piece downstream edge, the second piece downstream edge, or any combination thereof, by induction heating from ambient temperature to about 121° C. to about 176° C. during a downstream preheating duration of about 10-30 minutes; or wherein the longitudinal instillation temperature, the upstream circumferential instillation temperature, or the downstream circumferential instillation temperature, or any combination thereof, is from about 121° C. to about 176° C., wherein the longitudinal instillation temperature, the upstream circumferential instillation temperature, or the downstream circumferential instillation temperature is a surface temperature of a portion the first piece or the second piece, or any combination thereof; or wherein the induction heating source is operated at a power of from about 15 kW to about 120 kW, at a frequency of 3 kHz to about 10 kHz or both; or wherein the induction heating source includes a metal wire enclosed within a rubber tubing, and wherein water flows between the metal wire and an interior of the rubber tubing; or any combination thereof.

Embodiment 13. The method of one or more of embodiments 8-15, further comprising;

reducing an amount of moisture under the tee fitting to mitigate the risk of hydrogen induced cracking in the upstream circumferential seam by forming or maintaining an upstream moisture seal during seam welding at least a portion of the longitudinal seam, circumferential welding the downstream circumferential seam, or both;

reducing an amount of moisture under the tee fitting to mitigate the risk of hydrogen induced cracking in the downstream circumferential seam by forming or maintaining a downstream moisture seal during seam welding at least a portion of the longitudinal seam, circumferential welding the upstream circumferential seam, or both; or any combination thereof.

Embodiment 14. A method of welding a tee fitting to a pipeline, comprising:

providing the pipeline, wherein the pipeline includes an upstream pipeline portion, a downstream pipeline portion, and the pipeline contains a product; and providing a tee fitting, wherein the tee fitting includes or more tee fitting pieces, including a first piece and a second piece, wherein the first piece includes a first piece nozzle including a first piece nozzle opening, a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and positioning a moisture absorbing material between the first piece nozzle opening and the pipeline; and sealing the first piece nozzle opening with a nozzle moisture barrier; and heating at least a portion of the first piece bottom edge and the second piece top edge to a longitudinal instillation temperature by induction heating, resistance heating, gas torch heating or any combination thereof; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

Embodiment 15. The method of one or more of embodiments 1-7 and 14-15, further comprising;

removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or tack welding the longitudinal seam before seam welding the longitudinal seam; or any combination thereof.

EXAMPLES

1. Lay out fitting dimension on pipeline.
2. Inspect and prep fitting and clean all weld seams.
3. Install bottom half fitting.
4. Set flange top side fitting.
5. Chain both sides of fitting.
6. Install metal backing strips on long seams grooves.
7. Tight down and secure fitting.
8. Tack weld long seams.
9. Place moister absorbing power inside the fitting.
10. Cover flange outlet with plastic shrink wrap.
11. Preheat and weld long seams.
12. Install plastic shrink wrap both ends after cooling down is completed, forming a moisture barrier or moisture seal.
13. Unwrap first circumferential seam prior to commence seam welding.
14. Unwrap second circumferential seam prior to commence seam welding.
15. After all, seam welding has been completed, remove shrink wrap from flange outlet and remove moister absorbing power.

What is claimed is:

1. A method of welding a tee fitting to a pipeline, comprising:

providing the pipeline, wherein the pipeline includes an upstream pipeline portion, a downstream pipeline portion, and the pipeline contains a product; and providing a tee fitting, wherein the tee fitting includes two or more tee fitting pieces, including a first piece and a second piece, wherein the first piece includes a first piece nozzle including a first piece nozzle opening, a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and positioning a moisture absorbing material between the first piece nozzle opening and the pipeline; and sealing the first piece nozzle opening with a nozzle moisture barrier; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

2. The method of claim 1, further comprising;

removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential seam; or tack welding the longitudinal seam before seam welding the longitudinal seam; or any combination thereof.

3. The method of claim 1, wherein the pipeline has an internal diameter of about 30.5 cm to about 152.4 cm; or wherein the product flows from an upstream direction to a downstream direction within the pipeline; or wherein the product is flowing from an upstream direction to a downstream direction within the pipeline at a flow rate of from about 4.6 m/s to about 30.5 m/s; or wherein the product has a product temperature, and the pipeline has a pipeline temperature below a weld proceed preheat requirement temperature; or any combination thereof.

4. The method of claim 1, further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours; or further comprising:

wherein seam welding the longitudinal seam, includes a first welding duration of from about 4 to about 12 hours, and then removing the upstream moisture seal, the downstream moisture seal, or both, and then seam welding the longitudinal seam for a second welding duration of from about 4 hours to about 12 hours, wherein the first welding duration and the second welding duration are separated by a cooling duration of about 4 hours to about 6 hours; or wherein first seam welding duration, the second welding duration, and the cooling duration have an aggregate longitudinal seam welding duration of about 12 to about 26 hours; or wherein seam welding the longitudinal seam, includes a first welding duration of from about 4 to about 12 hours, and then forming or re-forming the upstream moisture seal, the downstream moisture seal, or both, during a cooling duration, and then removing the upstream moisture seal, the downstream moisture seal, or both, and then seam welding the longitudinal seam for a second welding duration of from about 4 hours to about 12 hours; or any combination thereof.

5. The method of claim 2, further comprising:

heating at least a portion of the first piece bottom edge, the second piece top edge, or any combination thereof, by induction heating from ambient temperature to about 121° C. to about 176° C. during a longitudinal preheating duration of about 10-30 minutes; or heating at least a portion of the first piece upstream edge, the second piece upstream edge, or any combination thereof, by induction heating from ambient temperature to about 121° C. to about 176° C. during an upstream preheating duration of about 10-30 minutes; or heating at least a portion of the first piece downstream edge, the second piece downstream edge, or any combination thereof, by induction heating from ambient temperature to about 121° C. to about 176° C. during a downstream preheating duration of about 10-30 minutes; or wherein the longitudinal instillation temperature, the upstream circumferential instillation temperature, or the downstream circumferential instillation temperature, or any combination thereof, is from about 121° C. to about 176° C., wherein the longitudinal instillation temperature, the upstream circumferential instillation temperature, or the downstream circumferential instillation temperature is a surface temperature of a portion the first piece or the second piece, or any combination thereof; or wherein the induction heating source is operated at a power of from about 15 kW to about 120 KW, at a frequency of 3 kHz to about 10 kHz or both; or wherein the induction heating source includes a metal wire enclosed within a rubber tubing, and wherein water flows between the metal wire and an interior of the rubber tubing; or any combination thereof.

6. The method of claim 2, further comprising;

reducing an amount of moisture under the tee fitting to mitigate the risk of hydrogen induced cracking in the upstream circumferential seam by forming or maintaining an upstream moisture seal during seam welding at least a portion of the longitudinal seam, circumferential welding the downstream circumferential seam, or both; or reducing an amount of moisture under the tee fitting to mitigate the risk of hydrogen induced cracking in the downstream circumferential seam by forming or maintaining an downstream moisture seal during seam welding at least a portion of the longitudinal seam, circumferential welding the upstream circumferential seam, or both; or any combination thereof.

7. The method of claim 1, wherein the moisture absorbing material includes a solid desiccant in an open container; or wherein the moisture absorbing material includes a silica gel, a clay, calcium chloride, sodium chloride, potassium chloride, calcium sulfate, calcium oxide, or any combination or mixture thereof; or wherein the moisture barrier includes a single homogenous film or membrane; or wherein the moisture barrier includes a polymer film, a wax paper, a polyolefin film, a polyvinyl chloride film, a polyethylene film, a paraffin film, a polyvinylidene chloride film, a tape, or any combination thereof; or any combination thereof.

8. A method of welding a tee fitting to a pipeline, comprising:

providing the pipeline, wherein the pipeline includes an upstream pipeline portion, a downstream pipeline portion, and the pipeline contains a product; and providing a tee fitting, wherein the tee fitting includes 2 or more tee fitting pieces, including a first piece and a second piece, wherein the first piece includes a first piece bottom edge, a first piece upstream side edge, a first piece downstream side edge, and wherein the second piece includes a second piece top edge, a second piece upstream side edge, and a second piece downstream side edge, wherein the first piece bottom edge has a shape that fits or complements the second piece top edge; and forming an upstream circumferential seam by bringing the first piece upstream side edge and the second piece upstream side edge into contact with the upstream pipeline portion, and forming a downstream circumferential seam by bringing the first piece downstream side edge and the second piece downstream side edge into contact with the downstream pipeline portion; and forming a longitudinal seam by bringing the first piece bottom edge into contact with the second piece top edge; and heating at least a portion of the first piece bottom edge and the second piece top edge to a longitudinal instillation temperature by induction heating; and seam welding at least a portion of the longitudinal seam; and forming an upstream moisture seal by covering the upstream circumferential seam with an upstream moisture barrier; or forming a downstream moisture seal by covering the downstream circumferential seam with a downstream moisture barrier; or any combination thereof.

9. The method of claim 8, further comprising;

removing the upstream moisture seal; and heating the upstream circumferential seam by induction heating the first piece upstream edge, the second piece upstream edge, or both, to an upstream circumferential instillation temperature; and circumferential welding the upstream circumferential seam; or removing the downstream moisture seal; and heating the downstream circumferential seam by induction heating the first piece downstream edge, the second piece downstream edge, or both, to a downstream circumferential instillation temperature; and circumferential welding the downstream circumferential
seam; or tack welding the longitudinal seam before seam welding
the longitudinal seam; or any combination thereof.

10. The method of claim 8, wherein the pipeline has an
internal diameter of about 30.5 cm to about 152.4 cm; or wherein the product flows from an upstream direction to
a downstream direction within the pipeline; or wherein the product is flowing from an upstream direction
to a downstream direction within the pipeline at a flow
rate of from about 4.6 m/s to about 30.5 m/s; or wherein the product has a product temperature, and the
product temperature is below an ambient temperature;
or any combination thereof.

11. The method of claim 8, further comprising:

wherein seam welding the longitudinal seam, includes a
first welding duration of from about 4 to about 12
hours, and then removing the upstream moisture seal, the downstream
moisture seal, or both, and then seam welding the longitudinal seam for a second welding
duration of from about 4 hours to about 12 hours; or further comprising:

wherein seam welding the longitudinal seam, includes a
first welding duration of from about 4 to about 12
hours, and then removing the upstream moisture seal, the downstream
moisture seal, or both, and then seam welding the longitudinal seam for a second welding
duration of from about 4 hours to about 12 hours,
wherein the first welding duration and the second
welding duration are separated by a cooling duration of
about 4 hours to about 6 hours; or wherein first seam welding duration, the second welding
duration, and the cooling duration have an aggregate
longitudinal seam welding duration of about 12 to
about 26 hours; or wherein seam welding the longitudinal seam, includes a
first welding duration of from about 4 to about 12
hours, and then forming or re-forming the upstream
moisture seal, the downstream moisture seal, or both,
during a cooling duration, and then removing the upstream moisture seal, the downstream
moisture seal, or both, and then seam welding the longitudinal seam for a second welding
duration of from about 4 hours to about 12 hours; or any combination thereof.

12. The method of claim 9, further comprising:

heating at least a portion of the first piece bottom edge, the
second piece top edge, or any combination thereof, by
induction heating from ambient temperature to about
121° C. to about 176° C. during a longitudinal preheat-
ing duration of about 10-30 minutes; or heating at least a portion of the first piece upstream edge,
the second piece upstream edge, or any combination
thereof, by induction heating from ambient temperature
to about 121° C. to about 176° C. during an upstream
preheating duration of about 10-30 minutes; or heating at least a portion of the first piece downstream
edge, the second piece downstream edge, or any com-
bination thereof, by induction heating from ambient
temperature to about 121° C. to about 176° C. during
a downstream preheating duration of about 10-30 min-
utes; or wherein the longitudinal instillation temperature, the
upstream circumferential instillation temperature, or
the downstream circumferential instillation tempera-
ture, or any combination thereof, is from about 121° C.
to about 176° C., wherein the longitudinal instillation
temperature, the upstream circumferential instillation
temperature, or the downstream circumferential instil-
lation temperature is a surface temperature of a portion
the first piece or the second piece, or any combination
thereof; or wherein the induction heating source is operated at a
power of from about 15 kW to about 120 KW, at a
frequency of 3 kHz to about 10 kHz or both; or wherein the induction heating source includes a metal
wire enclosed within a rubber tubing, and wherein
water flows between the metal wire and an interior of
the rubber tubing; or any combination thereof.

13. The method of claim 9, further comprising;

reducing an amount of moisture under the tee fitting to
mitigate the risk of hydrogen induced cracking in the
upstream circumferential seam by forming or maintain-
ing an upstream moisture seal during seam welding at
least a portion of the longitudinal seam, circumferential
welding the downstream circumferential seam, or both;

reducing an amount of moisture under the tee fitting to
mitigate the risk of hydrogen induced cracking in the
downstream circumferential seam by forming or main-
taining a downstream moisture seal during seam weld-
ing at least a portion of the longitudinal seam, circum-
ferential welding the upstream circumferential seam, or
both; or any combination thereof.

* * * * *